US007911563B2

(12) United States Patent
Hung

(10) Patent No.: US 7,911,563 B2
(45) Date of Patent: Mar. 22, 2011

(54) POLARIZER-AND-COMPENSATOR ASSEMBLY AND METHOD FOR MAKING THE SAME

(75) Inventor: Wei-Che Hung, Tauyan (TW)

(73) Assignee: Far Eastern New Century Corporation, Taipei (TW)

( * ) Notice: Subject to any disclaimer, the term of this patent is extended or adjusted under 35 U.S.C. 154(b) by 759 days.

(21) Appl. No.: 11/898,882

(22) Filed: Sep. 17, 2007

(65) Prior Publication Data

US 2008/0239209 A1   Oct. 2, 2008

(30) Foreign Application Priority Data

Mar. 28, 2007   (TW) .............................. 96110800 A

(51) Int. Cl.
*G02F 1/1347* (2006.01)
*G02F 1/1335* (2006.01)

(52) U.S. Cl. ................ 349/96; 349/74; 349/76; 349/123

(58) Field of Classification Search .............. 349/74–76, 349/96, 123
See application file for complete search history.

(56) References Cited

U.S. PATENT DOCUMENTS

| 6,411,355 | B1 * | 6/2002 | Manabe et al. | ............... 349/120 |
| 2007/0076154 | A1 * | 4/2007 | Itakura et al. | ................. 349/117 |
| 2007/0085951 | A1 * | 4/2007 | Hale et al. | ..................... 349/117 |

* cited by examiner

*Primary Examiner* — Julie-Huyen L Ngo
(74) *Attorney, Agent, or Firm* — Finnegan, Henderson, Farabow, Garrett & Dunner, L.L.P.

(57) ABSTRACT

A method for making a polarizer-and-compensator assembly includes: (a) forming an alignment film on a releasable substrate; (b) forming a liquid crystal film on the alignment film so as to form a compensator layer on the releasable substrate; and (c) transferring the compensator layer from the releasable substrate to a polarizer plate by removing the releasable substrate from the compensator layer and attaching the alignment film to the polarizer plate.

13 Claims, 2 Drawing Sheets

POLARIZER-AND-COMPENSATOR ASSEMBLY AND METHOD FOR MAKING THE SAME

CROSS-REFERENCE TO RELATED APPLICATION

This application claims priority of Taiwanese Patent Application No. 096110800, filed on Mar. 28, 2007.

BACKGROUND OF THE INVENTION

1. Field of the Invention

This invention relates to a polarizer-and-compensator assembly and a method for making the same, more particularly to a method using a releasable substrate for making the polarizer-and-compensator assembly.

2. Description of the Related Art

Conventional methods for making a polarizer-and-compensator assembly for a liquid crystal display panel normally include the steps of forming a polarizer plate that has a pair of protective films of cellulous acetate (TAC) and a stretched iodine-doped polyvinyl alcohol (PVA) film sandwiched between the protective films, forming a compensator plate, and attaching the compensator plate to the polarizer plate. The compensator plate is formed by coating an alignment film on a transparent substrate, rubbing the alignment film along a predetermined angle, and applying a liquid crystal film on the rubbed alignment film. Since the assembly of the liquid crystal film and the alignment film are very thin, it cannot support itself for the subsequent processing. Hence, the transparent substrate is required to support the assembly for the subsequent processing, and becomes a part of the conventional polarizer-and-compensator assembly, which undesirably results in an increase in the overall layer thickness of the conventional polarizer-and-compensator assembly.

SUMMARY OF THE INVENTION

Therefore, the object of this invention is to provide a method for making a polarizer-and-compensator assembly that is capable of overcoming the aforesaid drawback of the prior art.

Another object of this invention is to provide a polarizer-and-compensator assembly that is dispensed with the aforesaid transparent substrate included in the conventional polarizer-and-compensator assembly.

According to one aspect of the present invention, a method for making a polarizer-and-compensator assembly comprises: (a) forming an alignment film on a releasable substrate; (b) forming a liquid crystal film on the alignment film so as to form a compensator layer on the releasable substrate; and (c) transferring the compensator layer from the releasable substrate to a polarizer plate by removing the releasable substrate from the compensator layer and attaching the alignment film to the polarizer plate.

According to another aspect of the present invention, a polarizer-and-compensator assembly comprises a polarizer plate and a compensator layer. The polarizer plate includes a stretched polarizer sheet and a protective layer formed on a first side of the stretched polarizer sheet. The compensator layer includes an alignment film attached to a second side of the stretched polarizer sheet opposite to the first side of the stretched polarizer sheet, and a liquid crystal film formed on the alignment film and disposed opposite to the stretched polarizer sheet.

BRIEF DESCRIPTION OF THE DRAWINGS

Other features and advantages of the present invention will become apparent in the following detailed description of the preferred embodiments of the invention, with reference to the accompanying drawings. In the drawings.

DETAILED DESCRIPTION OF THE PREFERRED EMBODIMENTS

Figure 1:
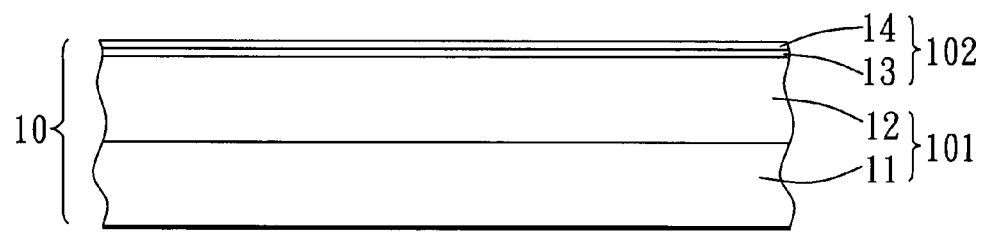
FIG. 1 is a schematic view of the preferred embodiment of a polarizer-and-compensator assembly according to this invention.

Before the present invention is described in greater detail, it should be noted that same reference numerals have been used to denote like elements throughout the specification.

FIG. 1 illustrates the preferred embodiment of a polarizer-and-compensator assembly 10 according to this invention. The polarizer-and-compensator assembly 10 includes a polarizer plate 101 and a compensator layer 102. The polarizer plate 101 includes a stretched polarizer sheet 12 and a protective layer 11 formed on a first side of the stretched polarizer sheet 12. The compensator layer 102 includes an alignment film 13 attached to a second side of the stretched polarizer sheet 12 opposite to the first side of the stretched polarizer sheet 12, and a liquid crystal film 14 formed on the alignment film 13 and disposed opposite to the stretched polarizer sheet 12.

Preferably, the stretched polarizer sheet 12 is made from iodine-doped PVA. The protective layer 11 is preferably made from a material selected from the group consisting of TAC, polycarbonate, polyimide, polyester, polyacrylate, and polystyrene.

Preferably, the alignment film 13 is made from a machine rubbed PVA material which is formed with a plurality of grooves oriented in a predetermined direction. The liquid crystal film 14 is preferably composed of rod-like liquid crystal molecules.

Figure 2:
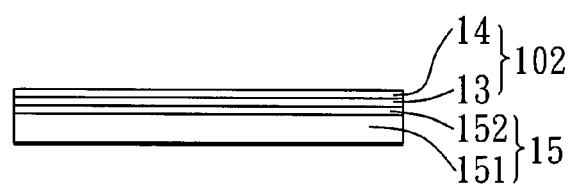
FIGS. 2 and 3 are schematic views to illustrate consecutive steps of the preferred embodiment of a method for making the polarizer-and-compensator assembly according to this invention.
Figure 3:
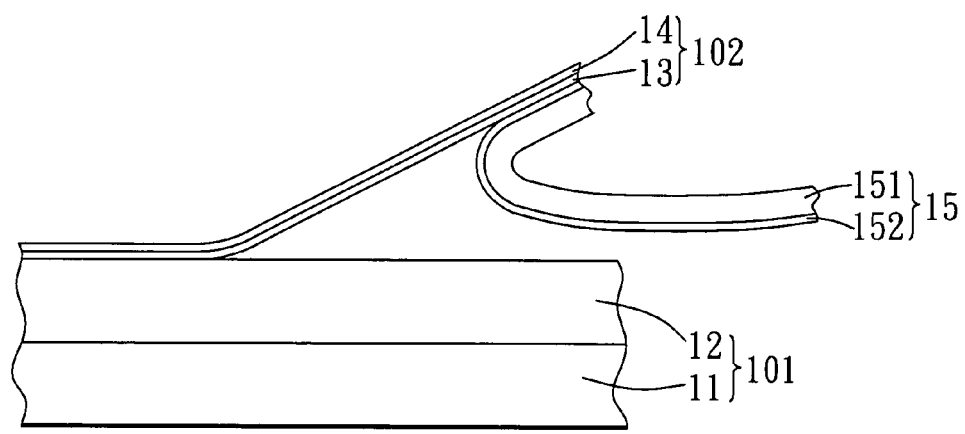

FIGS. 2 and 3 illustrate consecutive steps of the preferred embodiment of a method for making the polarizer-and-compensator assembly 10 according to this invention. The method includes the steps of: (a) forming the alignment film 13 on a releasable substrate 15 (see FIG. 2); (b) forming the liquid crystal film 14 on the alignment film 13 so as to form the compensator layer 102 on the releasable substrate 15 (see FIG. 2); and (c) transferring the compensator layer 102 from the releasable substrate 15 to the polarizer plate 101 by removing the releasable substrate 15 from the compensator layer 102 and attaching the alignment film 13 to the polarizer plate 101 (see FIG. 3) through a PVA adhesive (not shown) which is applied to at least one of the stretched polarizer sheet 12 and the alignment film 13.

In this embodiment, the releasable substrate 15 has a base layer 151 of polyethylene terephthalate (PET) and a releasable agent 152 coated on the base layer 151. The alignment film 13 is releasably bonded to the base layer 151 through the releasable agent 152.

The alignment film 13 is formed by applying a mixture containing PVA, a solvent, a surfactant and a cross-linking agent on the releasable substrate 15, drying the mixture, and rubbing the dried film in a predetermined oriented direction so as to form a plurality of grooves (not shown) therein. The liquid crystal film 14 is formed by applying a mixture containing a liquid crystal of rod-like molecules, a solvent, a photo initiator and a flow and leveling additive on the alignment film 13, heating the mixture, and irradiating the heated mixture with a polarized UV light to permit cross-linking of the mixture.

Figure 4:
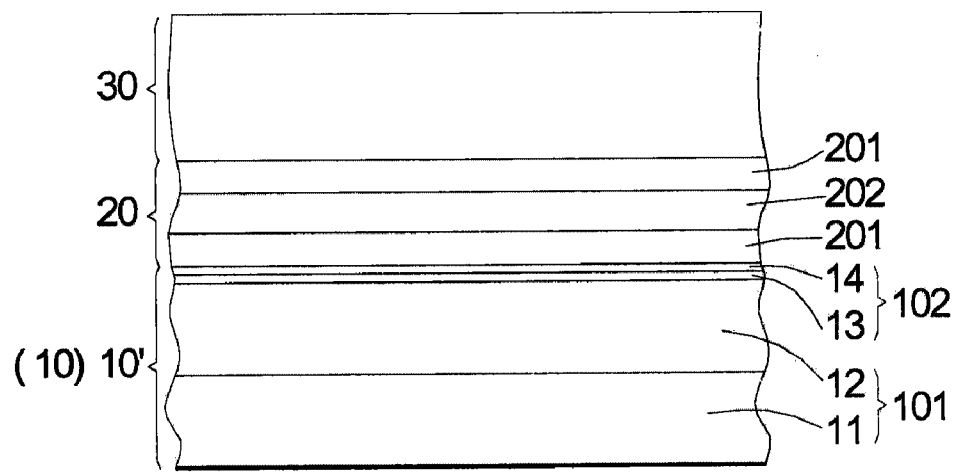
FIG. 4 is a schematic view of the first preferred embodiment of a liquid crystal display panel according to this invention.

FIG. 4 illustrates the first preferred embodiment of a liquid crystal display panel according to this invention. The liquid crystal display panel includes a first polarizer-and-compensator assembly 10', a second polarizer-and-compensator assembly 30, and a liquid crystal cell 20 sandwiched between and attached to the first and second polarizer-and-compensator assemblies 10', 30. In this embodiment, the first polarizer-and-compensator assembly 10' has the same structure as that of the polarizer-and-compensator assembly 10 formed according to the method of this invention. The second polarizer-and-compensator assembly 30 can be a polarizer-and-compensator assembly formed by the conventional methods. The liquid crystal cell 20 includes two opposite cell substrates 201 and a liquid crystal layer 202 disposed between the cell substrates 201. In this embodiment, the liquid crystal film 14 of the first polarizer-and-compensator assembly 10' is attached to an adjacent one of the cell substrates 201 of the liquid crystal cell 20 through a pressure sensitive adhesive (not shown).

Figure 5:
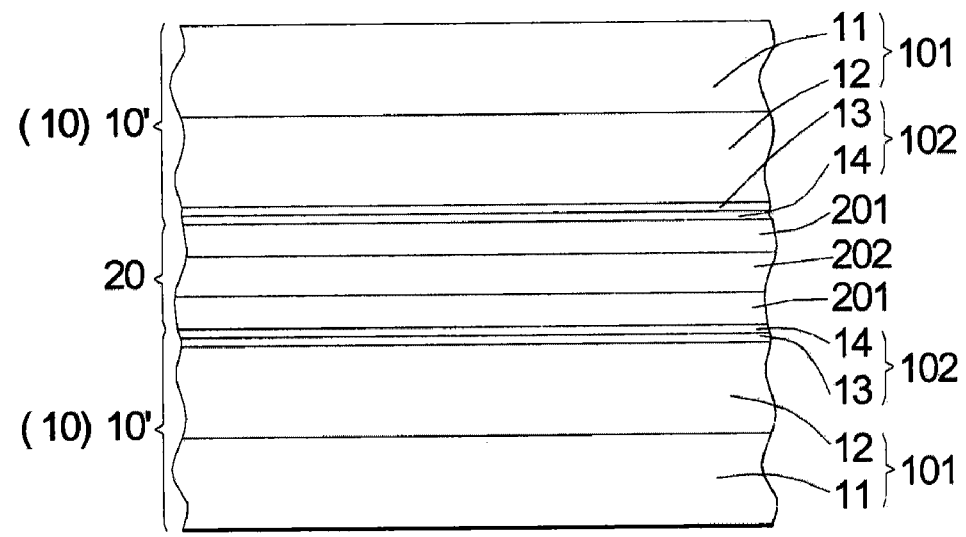
FIG. 5 is a schematic view of the second preferred embodiment of the liquid crystal display panel according to this invention.

FIG. 5 illustrates the second preferred embodiment of the liquid crystal display panel according to this invention. The second preferred embodiment differs from the previous embodiment in that the second polarizer-and-compensator assembly 30 of the first preferred embodiment is replaced with the first polarizer-and-compensator assembly 10' that has the same structure as that of the polarizer-and-compensator assembly 10 formed according to the method of this invention.

By using the releasable substrate 15 in the method of this invention, the polarizer-and-compensator assembly 10 thus formed can be dispensed with the aforesaid transparent substrate included in the conventional polarizer-and-compensator assembly. Hence, the overall layer thickness of the polarizer-and-compensator assembly 10 can be considerably reduced.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A method for making a polarizer-and-compensator assembly for a liquid crystal device, comprising:
   (a) forming an alignment film on a releasable substrate;
   (b) forming a liquid crystal film on the alignment film so as to form a compensator layer on the releasable substrate; and
   (c) transferring the compensator layer from the releasable substrate to a polarizer plate by removing the releasable substrate from the compensator layer and attaching the alignment film to the polarizer plate.

2. The method of claim 1, wherein the releasable substrate has a base layer of polyethylene terephthalate and a releasable agent coated on the base layer.

3. The method of claim 1, wherein the polarizer plate includes a stretched polarizer sheet and a protective layer formed on the stretched polarizer sheet.

4. The method of claim 2, wherein the stretched polarizer sheet is made from polyvinyl alcohol (PVA).

5. The method of claim 3, wherein the protective layer is made from a material selected from the group consisting of cellulose acetate (TAC), polycarbonate, polyimide, polyester, polyacrylate, and polystyrene.

6. The method of claim 1, wherein the alignment film is made from a machine rubbed polyvinyl alcohol (PVA) material.

7. The method of claim 1, wherein the liquid crystal film is composed of rod-like liquid crystal molecules.

8. A polarizer-and-compensator assembly for a liquid crystal device, comprising:
   a polarizer plate, including
      a stretched polarizer sheet, and
      a protective layer formed on a first side of said stretched polarizer sheet; and
   a compensator layer including
      an alignment film attached to a second side of said stretched polarizer sheet opposite to said first side of said stretched polarizer sheet, and
      a liquid crystal film formed on said alignment film and disposed opposite to said stretched polarizer sheet.

9. The polarizer-and-compensator assembly of claim 8, wherein said stretched polarizer sheet is made from polyvinyl alcohol (PVA).

10. The polarizer-and-compensator assembly of claim 8, wherein said protective layer is made from a material selected from the group consisting of cellulose acetate (TAC), polycarbonate, polyimide, polyester, polyacrylate, and polystyrene.

11. The polarizer-and-compensator assembly of claim 8, wherein said alignment film is made from a machine rubbed polyvinyl alcohol (PVA) material.

12. The polarizer-and-compensator assembly of claim 8, wherein said liquid crystal film is composed of rod-like liquid crystal molecules.

13. A liquid crystal display panel comprising:
   a liquid crystal cell including two opposite cell substrates and a liquid crystal layer disposed between said cell substrates; and
   first and second polarizer-and-compensator assemblies respectively attached to said two opposite cell substrates of said liquid crystal cell, each of said first and second polarizer-and-compensator assemblies including a polarizer plate and a compensator layer attached to said polarizer plate, said polarizer plate including a stretched polarizer sheet and a protective layer formed on a first side of said stretched polarizer sheet, said compensator layer including an alignment film attached to a second side of said stretched polarizer sheet opposite to said first side of said stretched polarizer sheet, and a liquid crystal film formed on said alignment film, disposed opposite to said stretched polarizer sheet, and attached to the corresponding one of said two opposite cell substrates of said liquid crystal cell.

* * * * *